US012036937B2

(12) United States Patent
Akoma et al.

(10) Patent No.: US 12,036,937 B2
(45) Date of Patent: Jul. 16, 2024

(54) LAP EXPANDING REACTIONARY AIRBAG

(71) Applicant: SCHROTH SAFETY PRODUCTS LLC, Ft. Lauderdale, FL (US)

(72) Inventors: Patrick Akoma, Aventura, FL (US); Manuel Marroquin, Margate, FL (US); Kasey Garces, Coconut Creek, FL (US)

(73) Assignee: SCHROTH SAFETY PRODUCTS, LLC, Ft. Lauderdale, FL (US)

( * ) Notice: Subject to any disclaimer, the term of this patent is extended or adjusted under 35 U.S.C. 154(b) by 0 days.

(21) Appl. No.: 17/535,087

(22) Filed: Nov. 24, 2021

(65) Prior Publication Data

US 2022/0161751 A1   May 26, 2022

Related U.S. Application Data

(60) Provisional application No. 63/118,478, filed on Nov. 25, 2020.

(51) Int. Cl.
*B60R 21/18*      (2006.01)
*B60R 21/231*    (2011.01)
*B64D 11/06*     (2006.01)
*B60R 21/00*     (2006.01)
*B60R 21/233*    (2006.01)

(52) U.S. Cl.
CPC .......... *B60R 21/18* (2013.01); *B60R 21/231* (2013.01); *B64D 11/06205* (2014.12); *B60R 2021/0004* (2013.01); *B60R 2021/0009* (2013.01); *B60R 2021/0093* (2013.01); *B60R 2021/23107* (2013.01); *B60R 2021/23308* (2013.01); *B64D 2201/00* (2013.01)

(58) Field of Classification Search
CPC ..... B60R 21/18; B60R 21/231; B60R 21/233; B60R 2021/0004; B60R 2021/0009; B60R 2021/23107; B60R 2021/23308; B60R 2021/0044; B60R 2021/0093; B64D 11/06205; B64D 2201/00
USPC ........................... 280/733, 729, 730.1, 743.1
See application file for complete search history.

(56) References Cited

U.S. PATENT DOCUMENTS

| | | | | |
|---|---|---|---|---|
| 3,430,979 A | * | 3/1969 | Terry ...................... | B60R 21/18 280/805 |
| 3,582,107 A | * | 6/1971 | Goetz ..................... | B60R 21/23 280/730.1 |
| 6,131,949 A | * | 10/2000 | Lewis .................... | B60R 21/261 280/739 |
| 6,293,582 B1 | * | 9/2001 | Lewis .................... | B60R 21/18 280/735 |
| 6,378,898 B1 | * | 4/2002 | Lewis .................... | B60R 21/18 280/739 |

(Continued)

FOREIGN PATENT DOCUMENTS

| | | | | |
|---|---|---|---|---|
| CN | 109204218 A | * | 1/2019 | ......... B60R 21/2072 |
| DE | 102009021045 A1 | * | 11/2010 | ....... B60R 21/23138 |

*Primary Examiner* — Keith J Frisby
(74) *Attorney, Agent, or Firm* — Trueba & Suarez, PLLC; Roberto M. Suarez, Esq.

(57) ABSTRACT

A lap expanding reactionary airbag apparatus includes separate expanding lap and chest portions of the airbag. When loaded in a frontal or oblique crash event, the two portions act as a reactionary surface against each other, reducing the chest velocity of a vehicle occupant, thereby reducing the forward movement of the occupant. This restriction in forward movement results in reduced lumbar injuries.

3 Claims, 15 Drawing Sheets

(56) References Cited

U.S. PATENT DOCUMENTS

| | | | |
|---|---|---|---|
| 10,232,815 B1* | 3/2019 | Dry | B60R 21/18 |
| 2006/0028004 A1* | 2/2006 | Oota | B60R 21/231 |
| | | | 280/733 |
| 2006/0119085 A1* | 6/2006 | Masuda | B60R 21/18 |
| | | | 280/733 |
| 2006/0255573 A1* | 11/2006 | Tobata | B60R 21/18 |
| | | | 280/733 |
| 2009/0278340 A1* | 11/2009 | Azuma | B60R 21/0136 |
| | | | 280/733 |
| 2015/0069741 A1* | 3/2015 | Shimazu | B60R 21/233 |
| | | | 280/729 |
| 2017/0291566 A1* | 10/2017 | Karlow | B60R 21/231 |
| 2019/0092264 A1* | 3/2019 | Spahn | B60N 2/14 |
| 2019/0111877 A1* | 4/2019 | Line | B60N 3/002 |
| 2021/0094496 A1* | 4/2021 | Tanaka | B60R 21/20 |
| 2021/0094504 A1* | 4/2021 | Tanaka | B60R 21/23138 |
| 2021/0129785 A1* | 5/2021 | Fischer | B60R 21/2338 |
| 2021/0300277 A1* | 9/2021 | Fukaura | B60R 21/2338 |
| 2021/0300278 A1* | 9/2021 | Hayashi | B60R 21/18 |

* cited by examiner

LAP EXPANDING REACTIONARY AIRBAG

CROSS-REFERENCE TO RELATED APPLICATIONS

This application is a non-provisional of, and claims priority to, provisional patent application Ser. No. 63/118,478, filed on Nov. 25, 2020, titled "Lap Expanding Reactionary Airbag," the disclosure and drawing figures of which are incorporated here as if fully set forth herein.

FIELD OF THE INVENTION

This invention relates generally to the field of vehicle restraints and, more specifically, to a safety apparatus in the form of a lap expanding reactionary airbag that addresses infinite setback lumbar issues of a frontal and oblique crash event.

BACKGROUND

Seating in a commercial aircraft environment has to meet a multitude of competing requirements. While passenger safety is first and foremost, commercial airline operators also desire to reduce seat pitch and increase passenger comfort. As seat pitch has decreased in order to place more seats in the aircraft, it has become increasingly more difficult to restrict passenger movement relative to the seat in a crash or high load event. As the seats move closer together, they also become more likely impact points for the seated passenger. It is known in the art to utilize lap belts to arrest the forward motion of the seat occupant. As seat pitch has reduced and now encroaches upon even the most restricted head arc (the path taken by the occupant's head as the body lurches forward in a crash event), cushions and airbags have been installed in the next forward seat in order to cushion the impact of the occupant's head on the forward structure.

In other situations, however, such as in the case of an exit row, the occupant is seated far enough away (a "setback") from the next forward structure (another seat, a bulkhead, etc. . . . ) that the head arc is not impeded. In these scenarios, the danger to the occupant comes not from the head strike concerns, but rather, injury to the spine in the lumbar region due to over-extension of the torso while the occupant is restrained at the lap or pelvis. Prior solutions for setback in commercial aircraft seating, commonly found in exit rows, have failed to meet lumbar injury prevention requirements.

It would, therefore be desirable to have a safety apparatus that is configured to address seat setback lumbar injury issues in a frontal and oblique crash event, as a solution is not currently available in the aviation restraint industry.

SUMMARY

In this specification and in the appended drawings and claims presented, words and phrases have the meanings commonly attributed to them in the relevant art (vehicular and aviation safety restraints and vehicular and aviation airbags) except as otherwise specified herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In view of the foregoing, an embodiment of the invention is directed toward a lap expanding reactionary airbag apparatus. To address the lumbar injury issue, the apparatus reduces the chest velocity of the occupant, thereby reducing the forward movement (in a frontal crash event). The airbag apparatus is configured with structures that fill the gap between the occupant's chest and lap, while maintaining a higher pressure to reduce movement relative to the seat structure. The apparatus is further configured to be small enough to ensure comfort for the occupant.

The reactionary airbag apparatus includes separate expanding lap and chest portions of the airbag that, when loaded, act as a reactionary surface against each other. This allows the airbag to be a considerably smaller form factor as the design incorporates a unique design to expand into a large bag to fill the void from chest to lap. In a preferred embodiment, the airbag apparatus is comprised of two panels sewn together only on the inner panel edge that, when filled with air, expands into the desired shape.

In other embodiments of the invention, the lap expanding reactionary airbag apparatus forms part of a safety system including, but not limited to: the lap expanding reactionary airbag, a seat belt, a single inflator, a fill tube, a metal coupler to attach to the inflator, and a cover. Aviation seat belts, inflators, fill tubes, couplers, and covers are known in the art of aviation safety restraints and aviation airbags and are not detailed in this disclosure. Furthermore, the attachment of the seat belt and airbag system to an aircraft seat structure is likewise known in the art.

While certain aspects of conventional technologies and methods in the relevant art have been discussed to facilitate disclosure of the invention, Applicant in no way disclaims these technical aspects or methods, and it is contemplated that the claimed invention may encompass one or more of the conventional technical aspects or methods discussed herein.

Similarly, while the invention is discussed here in the context of a commercial aircraft, application of the invention in other vehicles with similar seating and occupant safety issues is contemplated to be within the scope of the present invention.

In this specification, where a document, act, or item of knowledge is referred to or discussed, this reference or discussion is not an admission that the document, act, or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

BRIEF DESCRIPTION OF THE DRAWINGS

These and other features, aspects, and advantages of the present invention will become better understood with regard to the following description, appended claims, and accompanying drawings where the attached figures illustrate non-limiting embodiments of the invention disclosed herein.

DESCRIPTION

Figure 1:
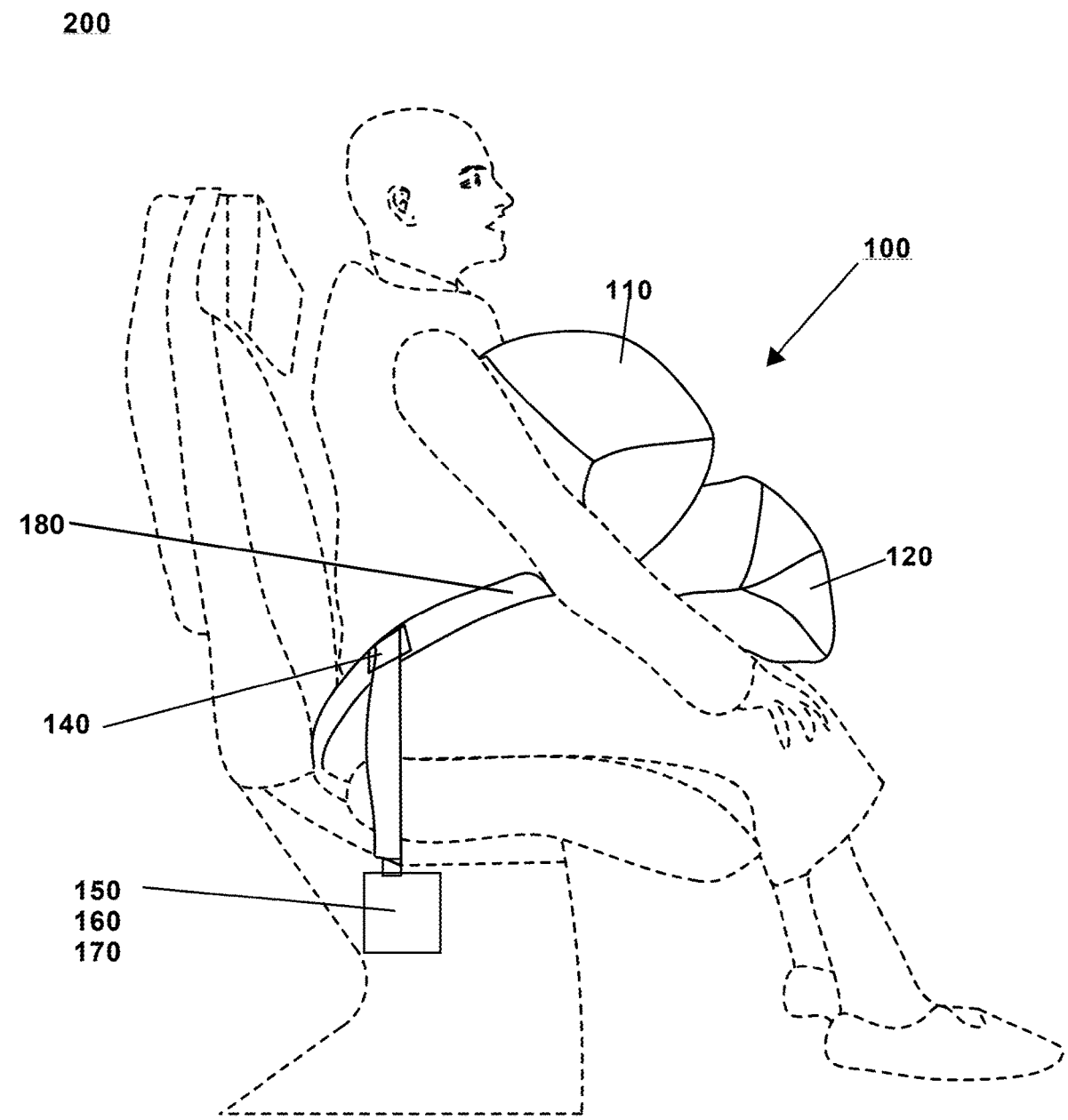
FIG. 1 shows a side view of a lap expanding reactionary airbag in the state of full inflation, according to an embodiment, where the occupant and the seat are shown in dashed lines for reference only.

In the Summary of the Invention above and in the Description below, and in the accompanying drawings and claims, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

In this specification and in the appended claims and drawings, "vehicle", including grammatical equivalents, singular and plural, is to be understood as a means of transport including, but not limited to, cars, trucks, vans, busses, boats, airplanes, or helicopters.

In this specification and in the appended claims and drawings, "occupant", including grammatical equivalents, singular and plural, is to be understood as a human passenger present in a seat in a vehicle. Any reference, structure, or limitation relative to the "occupant" are considered to be enabling disclosure to a person of ordinary skill in the art of occupant seat restraint design, as all occupant seat restraints are designed relative to an occupant.

In this specification and in the appended claims and drawings, "seat," including grammatical equivalents, singular and plural, is to be understood as a thing made or used for sitting on including, but not limited to, a seat, divan, bench, or sofa.

The terms "adapted" and "configured" are used interchangeably herein to state that a system or apparatus and machine can perform a certain function and is recited herein to provide guidance to those skilled in the art as to the scope of the claim.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶16.

While the specification will conclude with claims defining the features of embodiments of the invention that are regarded as novel, it is believed that the invention will be better understood from a consideration of the following description in conjunction with the figures, in which like reference numerals are carried forward.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Specifically, component names, types, and values, as depicted in the exemplary schematic diagrams, are not intended to limit the scope of the present invention and are presented only as possible embodiments.

The various embodiments of the invention disclosed and described herein are contemplated to be applicable to other types of vehicles as well, regardless of whether for air, land, sea, or space travel.

We discuss now a preferred embodiment of the present invention in the form of an airbag apparatus comprising: a lower chamber; an upper chamber; and an inlet in operable communication with both the lower chamber and the upper chamber.

Figure 2:
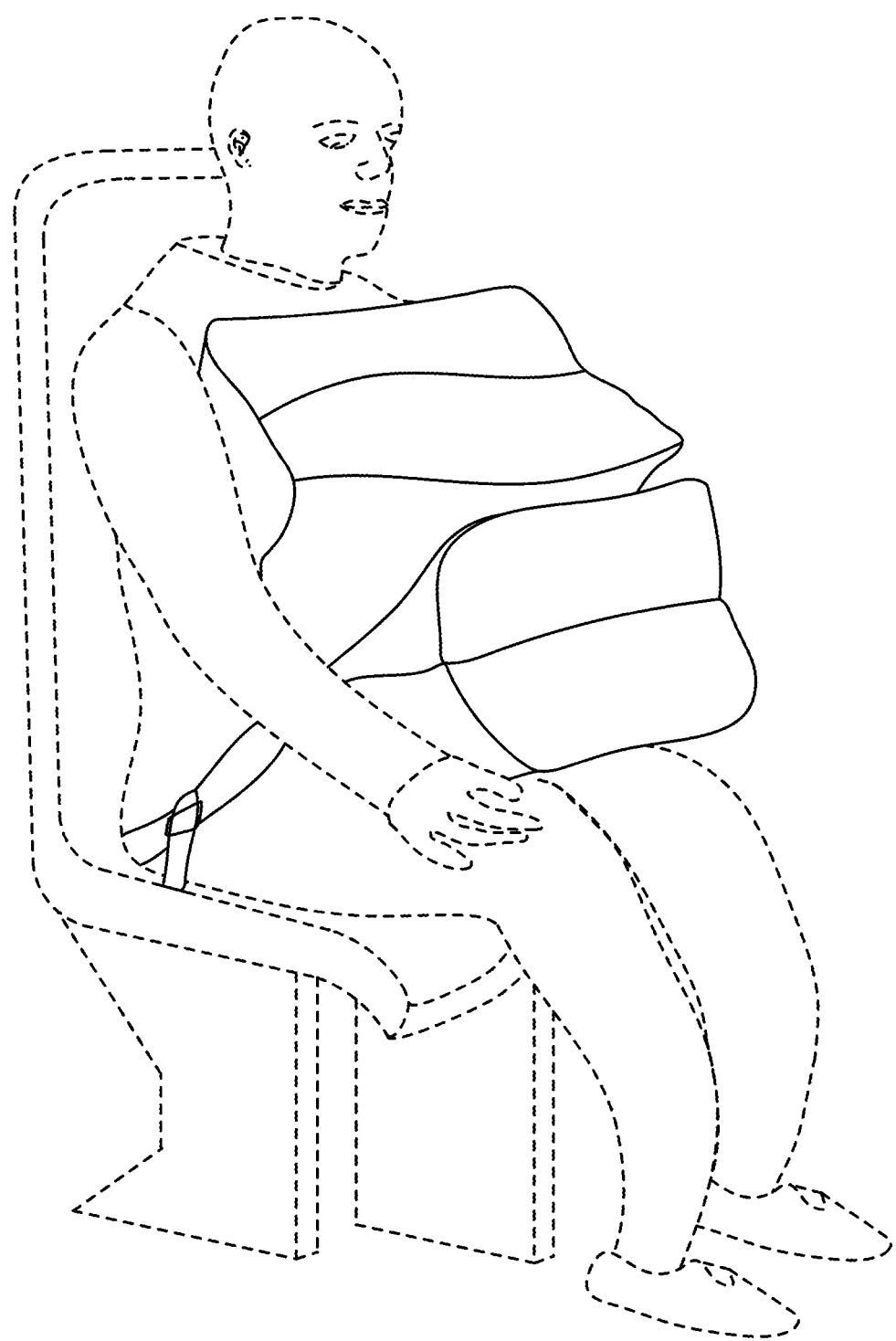
FIG. 2 is a front isometric view of FIG. 1, according to an embodiment.
Figure 3:
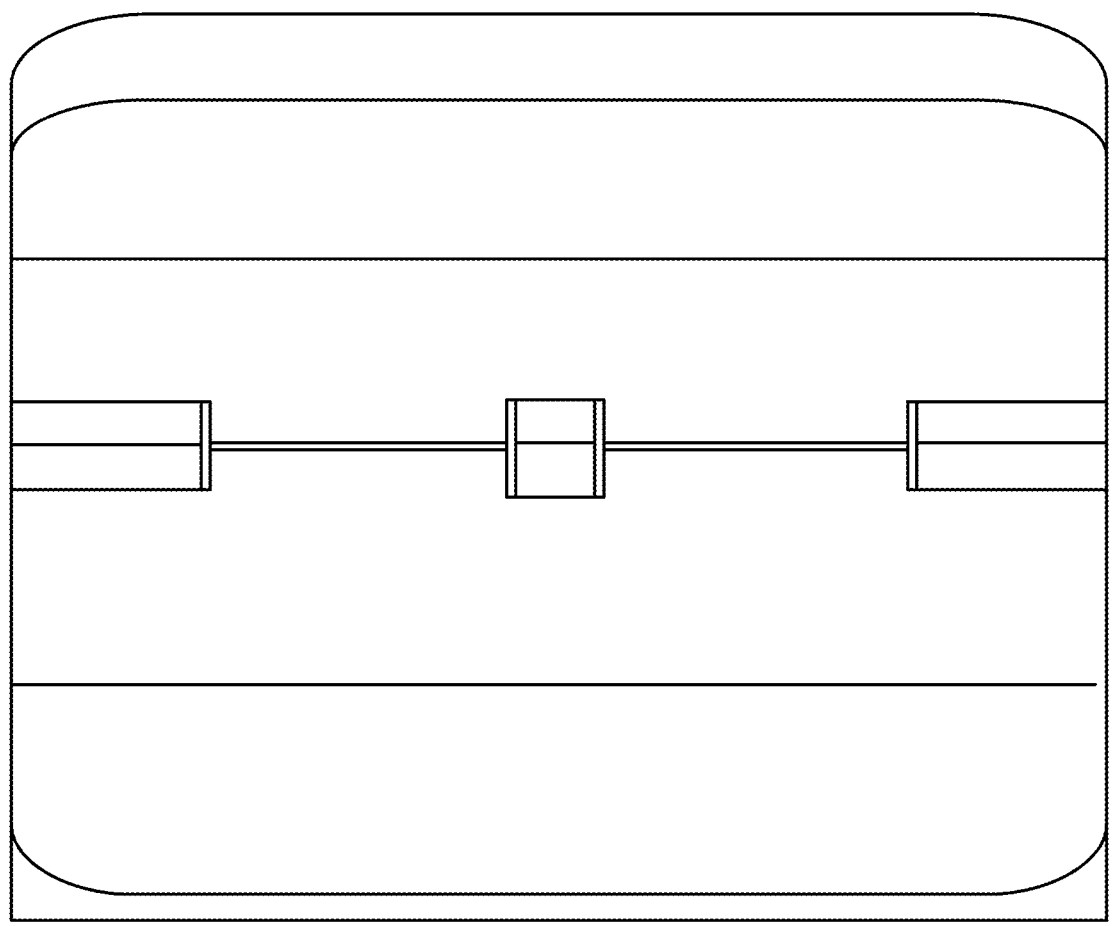
FIG. 3 shows a front view of a lap expanding reactionary airbag (non-inflated), according to an embodiment.
Figure 4:
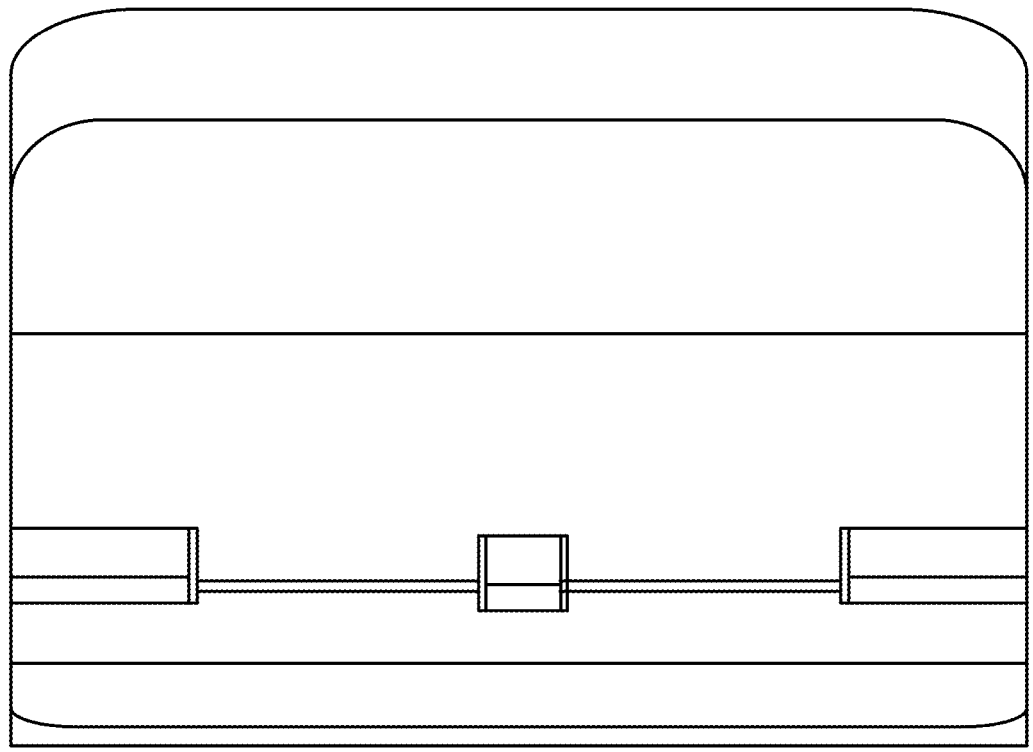
FIG. 4 shows another front view of a lap expanding reactionary airbag (non-inflated), according to an embodiment.
Figure 5:
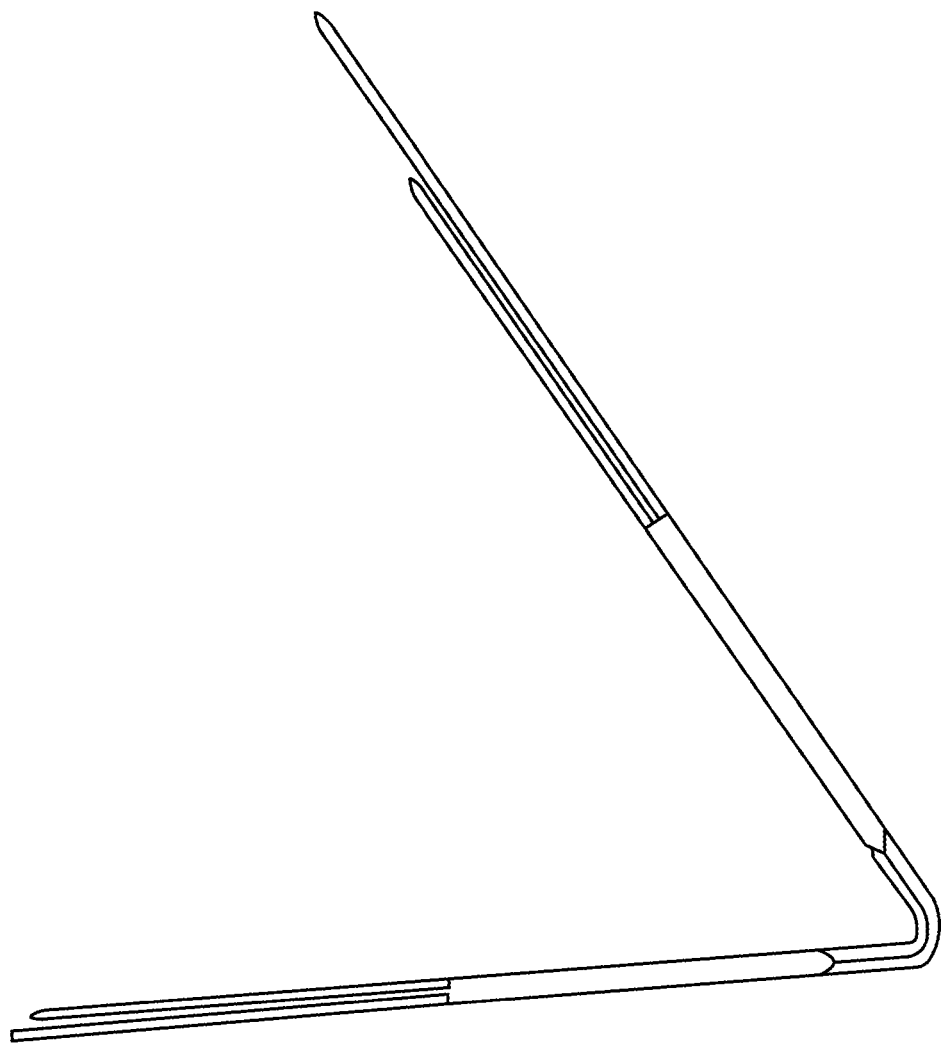
FIG. 5 shows a side view a lap expanding reactionary airbag (non-inflated), according to an embodiment.

The preferred embodiment is shown throughout the figures, and in particular FIGS. 1-2. An airbag 100 is disclosed to have two main chambers, a lower chamber 120 (also referenced as "lap part of airbag") and an upper chamber 110 (also referenced as "chest part of airbag"). When used throughout this disclosure, the terms "chest" and "lap" refer to the chest (front upper torso) and lap (thighs/upper legs) of a typical occupant.

It will be understood by a person of ordinary skill in the art that any restraint device is configured and referenced with respect to an occupant. The fact that the occupant can be any one of infinitely varied human beings does not render this apparatus disclosure indefinite. A human occupant has a chest and a lap in relatively consistent relation. Various human factor standards are employed by designers of airbags and vehicle restraint systems and are applied to the apparatus in order to comply with customer requests or regulatory agency requirements. In any case, the apparatus described herein is described in reference to a human occupant, having a chest and a lap, seated in a seat structure.

Figure 6:
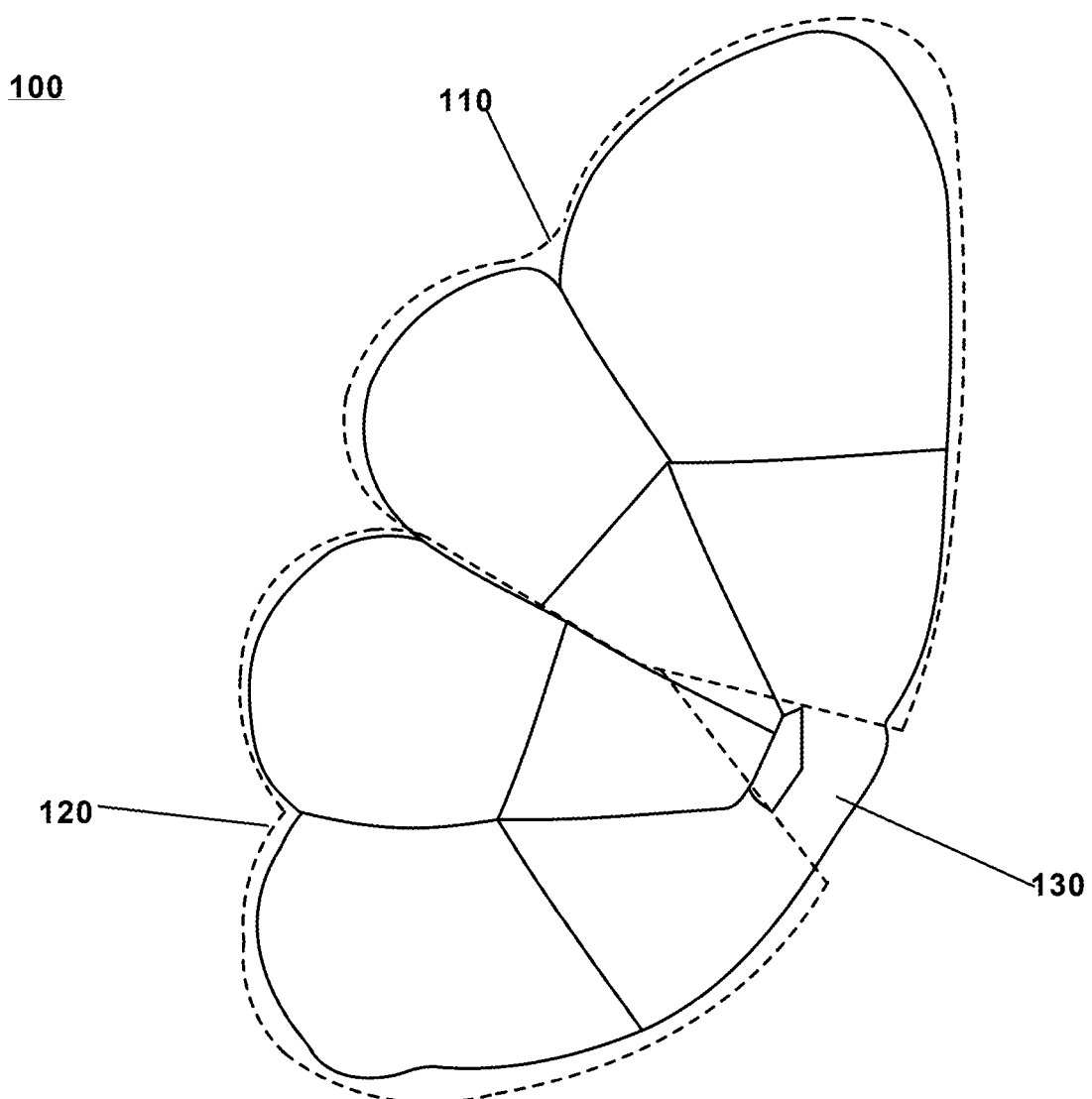
FIG. 6 shows the lap expanding reactionary airbag of FIG. 5 in the inflated state, where the dashed lines are shown to indicate the different sections of the airbag.
Figure 7:
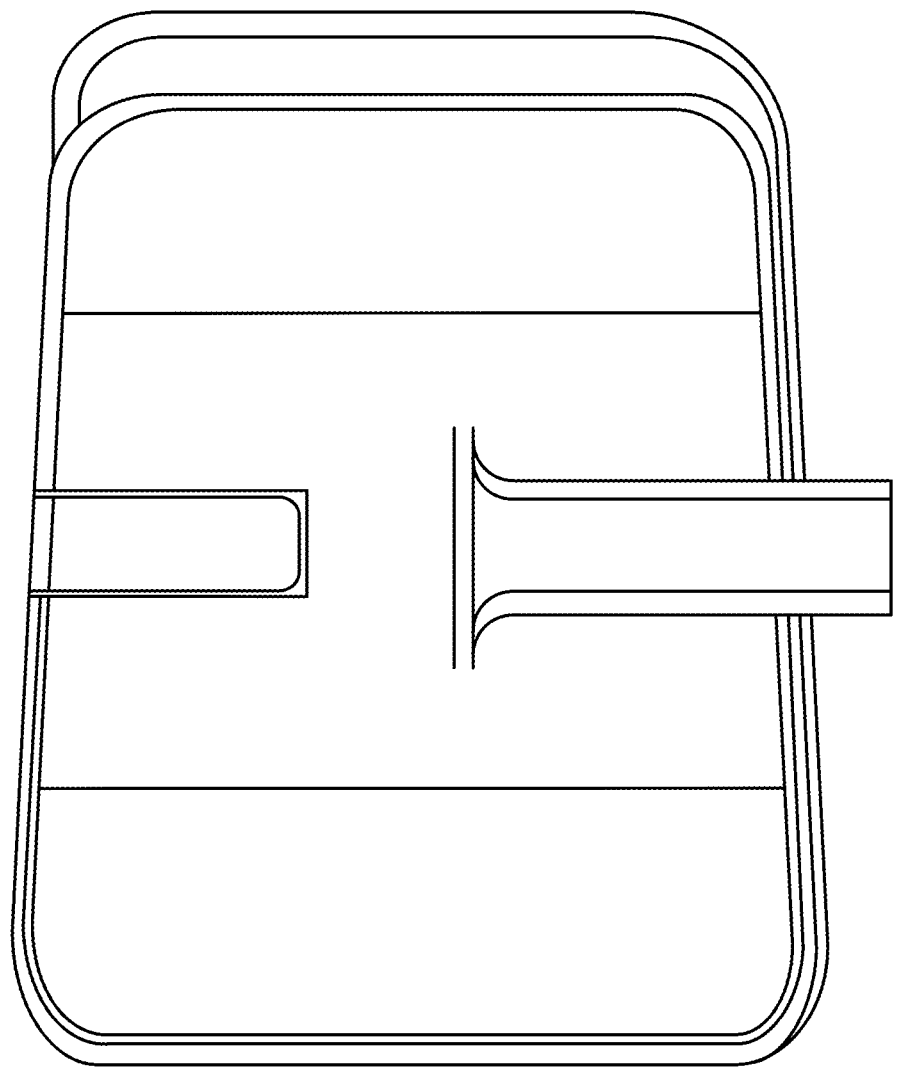
FIG. 7 shows a lap expanding reactionary airbag front panel, according to an embodiment.
Figure 8:
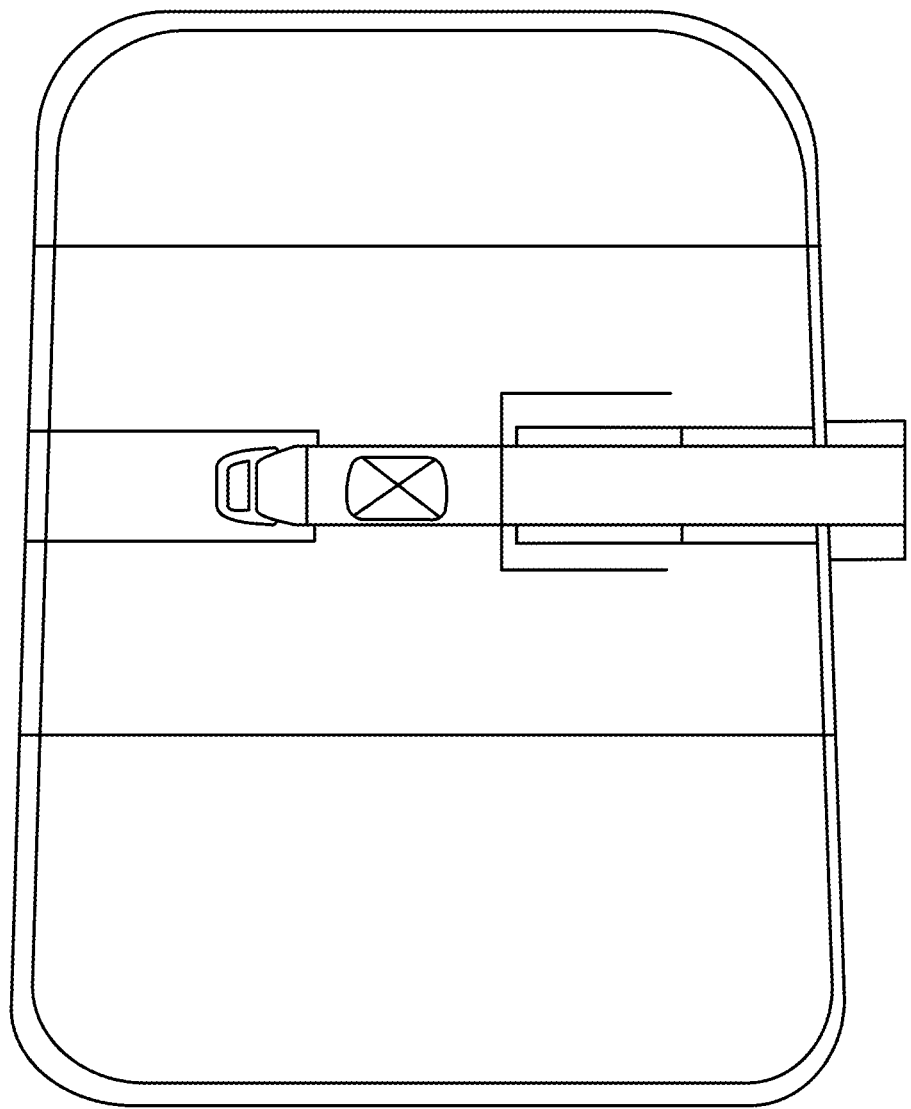
FIG. 8 shows the back panel of the lap expanding reactionary airbag of FIG. 7, according to an embodiment.
Figure 9:
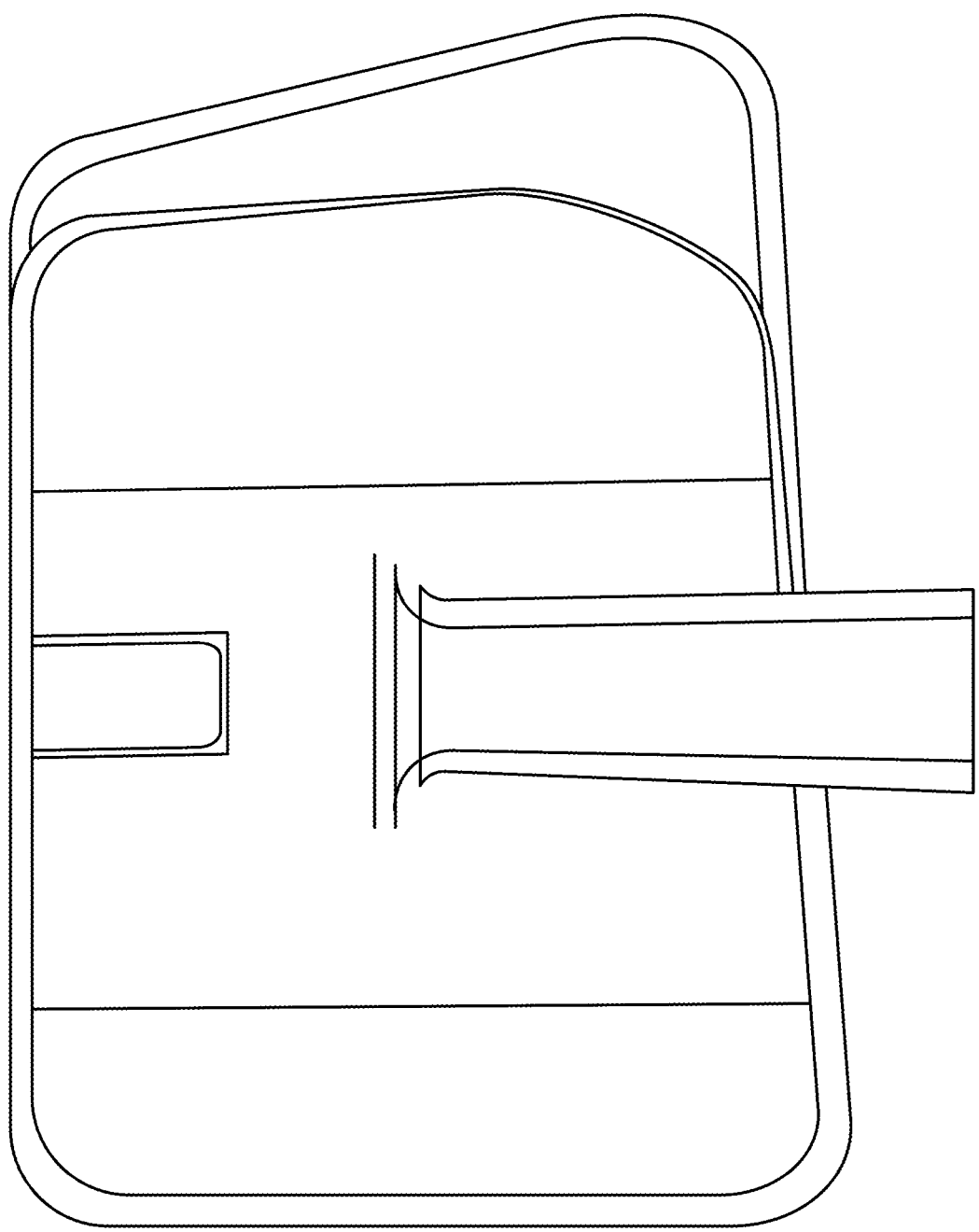
FIG. 9 shows the first upper panel of the lap expanding reactionary airbag of FIG. 7, according to an embodiment.
Figure 10:
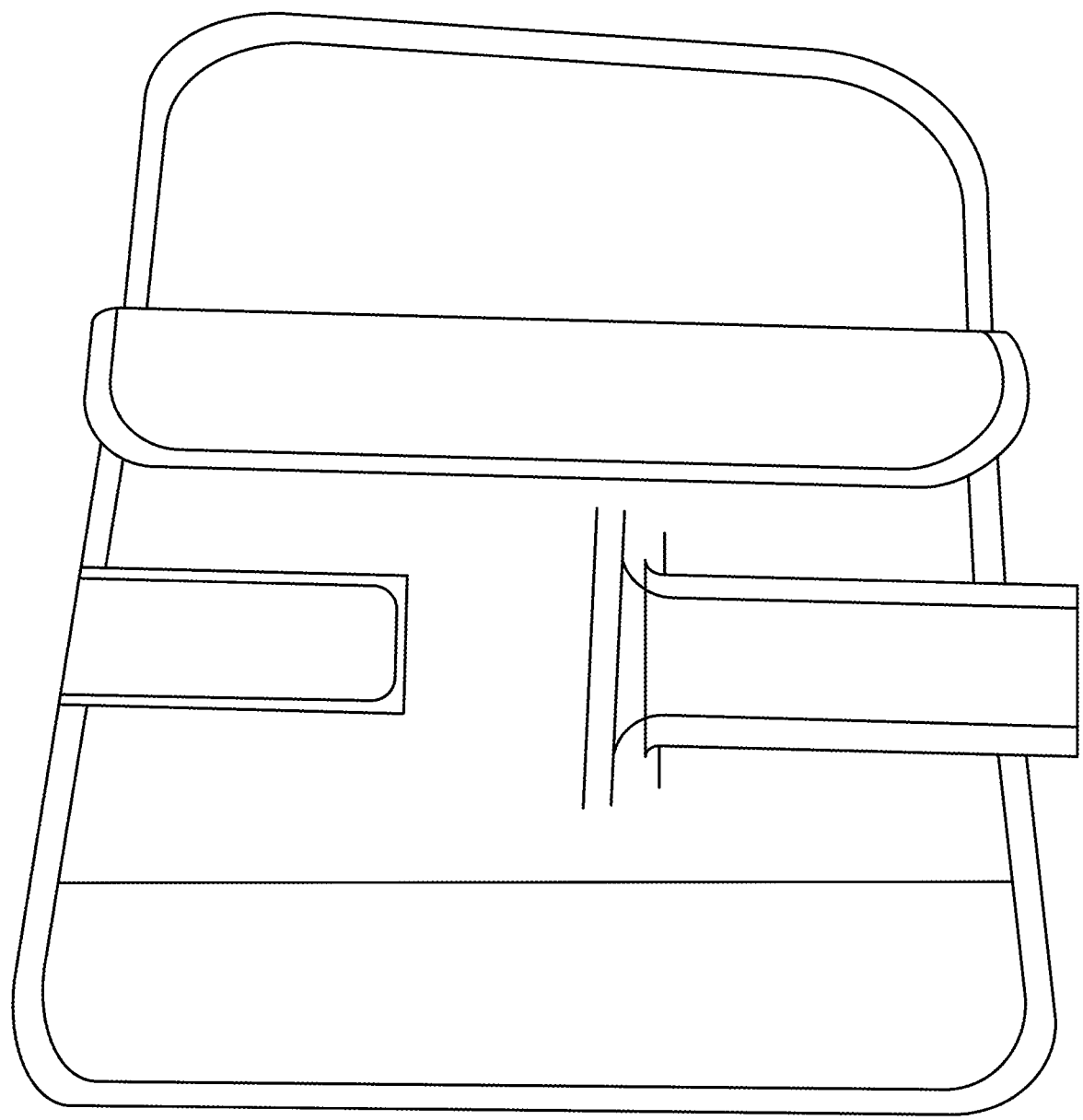
FIG. 10 shows the second upper panel of the lap expanding reactionary airbag of FIG. 7, according to an embodiment.
Figure 11:
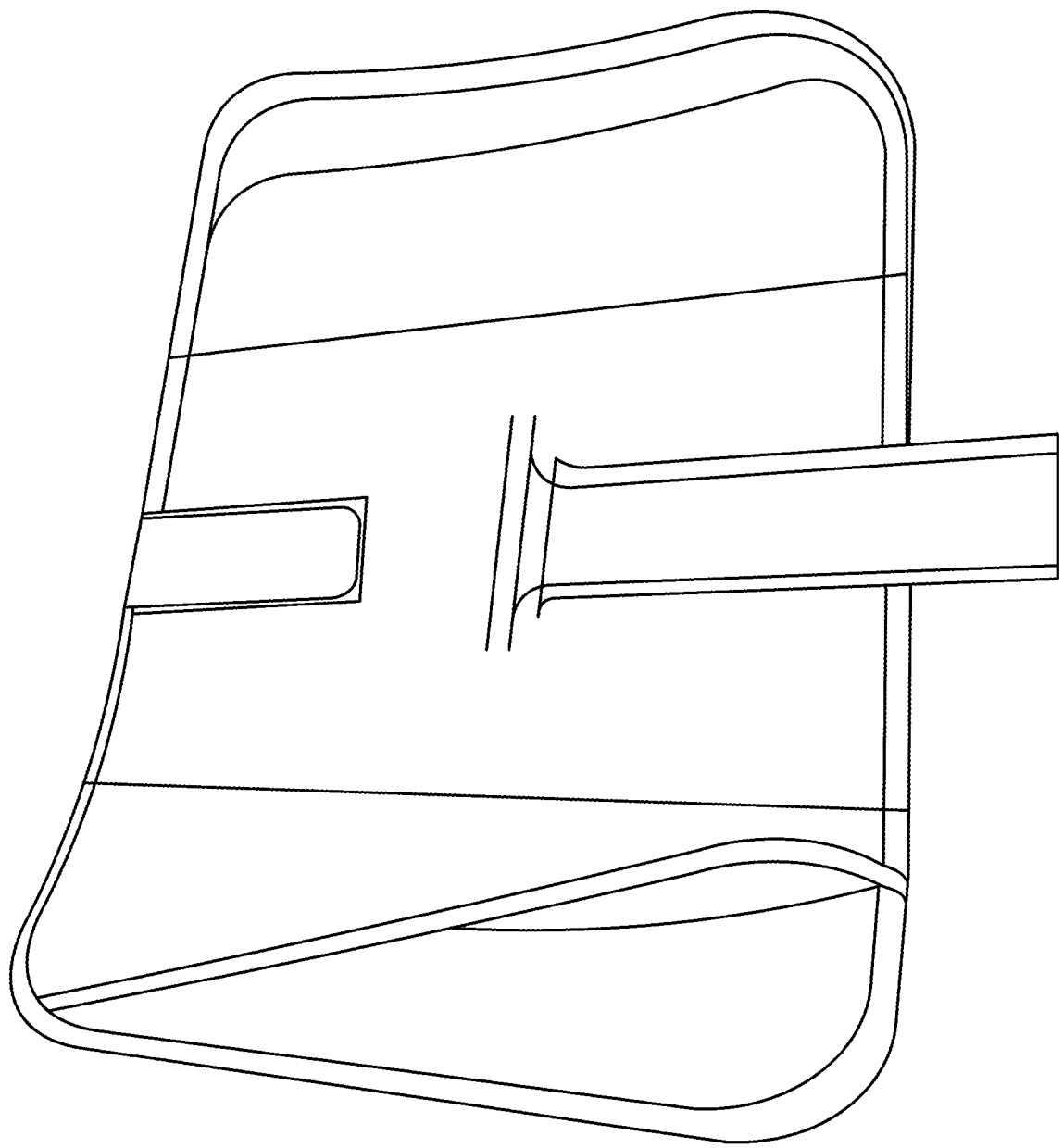
FIG. 11 shows the first lower panel of the lap expanding reactionary airbag of FIG. 7, according to an embodiment.
Figure 12:
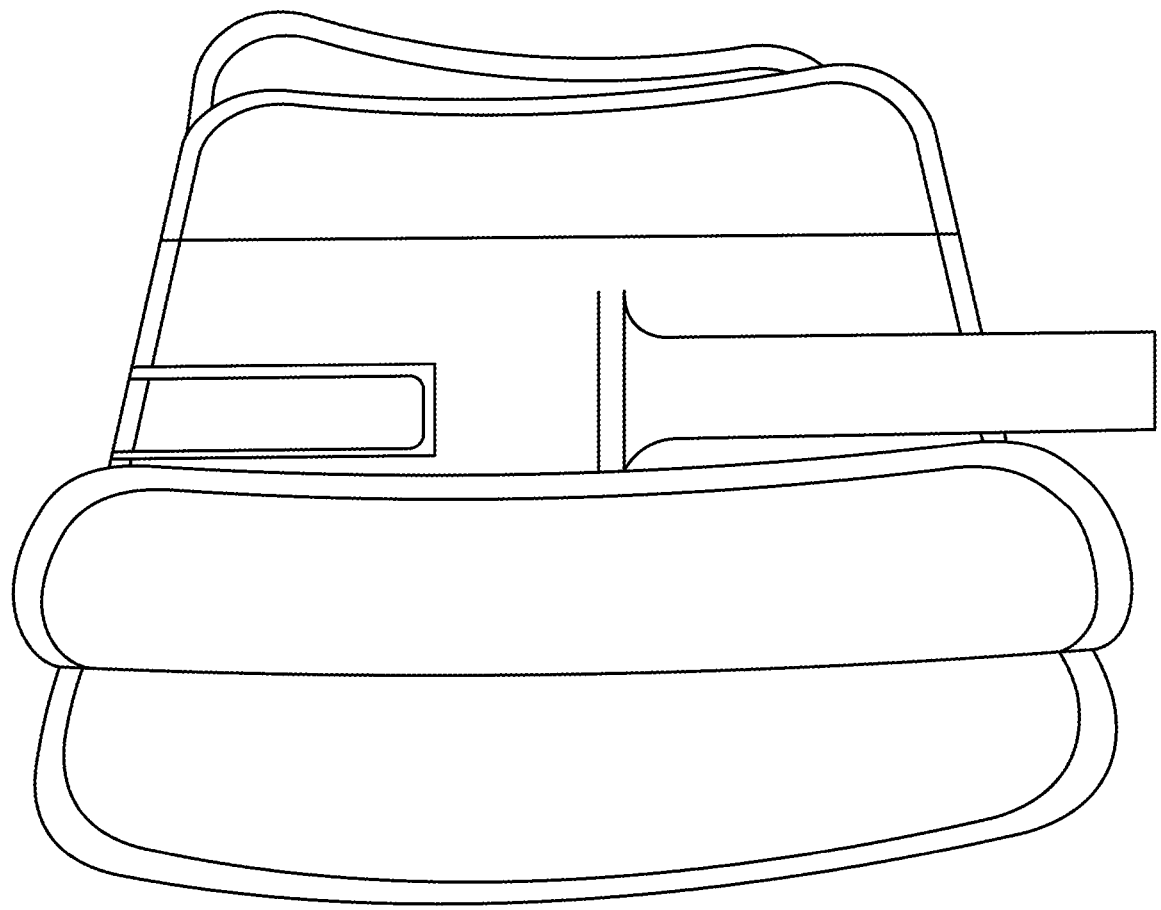
FIG. 12 shows the second lower panel of the lap expanding reactionary airbag of FIG. 7, according to an embodiment.
Figure 13:
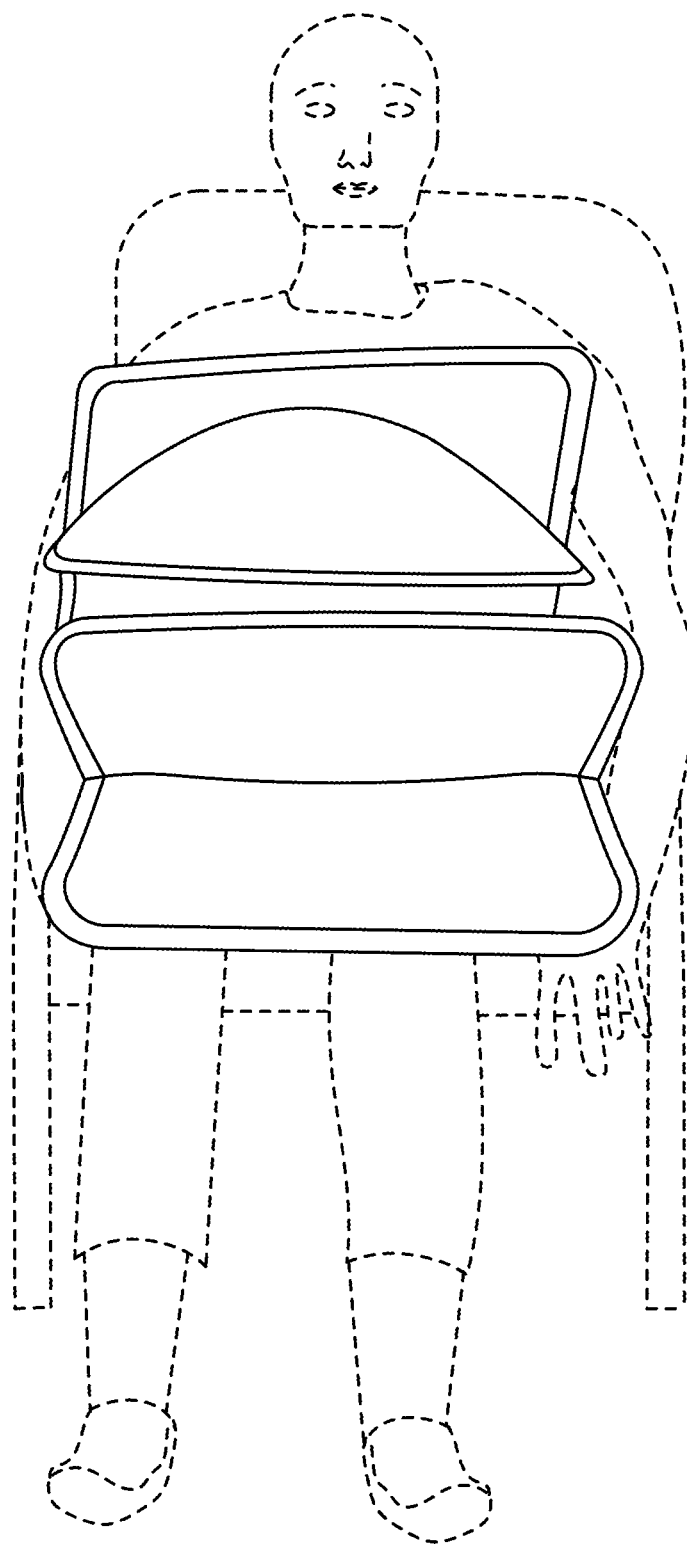
FIG. 13 shows a front view of FIG. 1, according to an embodiment.
Figure 14:
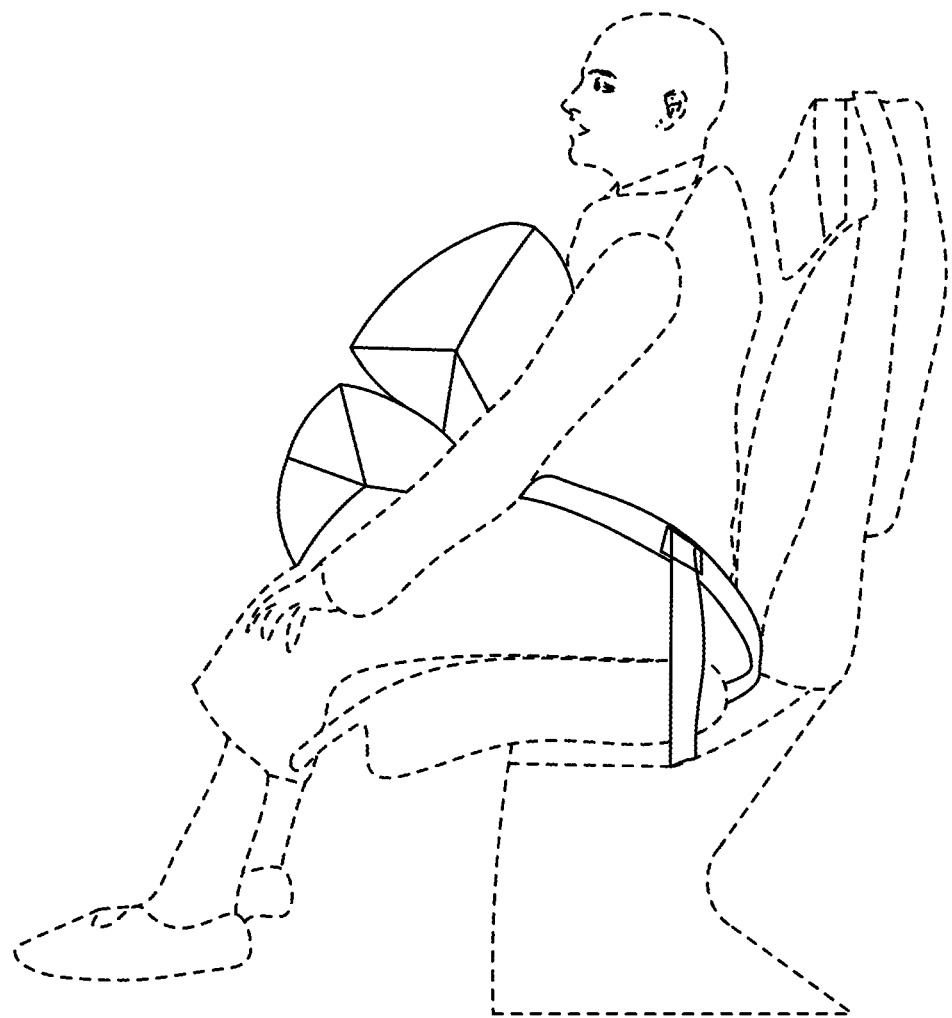
FIG. 14 shows a side view of FIG. 13, according to an embodiment.

With respect to the airbag 100, itself, and referring to FIG. 6, the upper chamber 110 and lower chamber 120 are connected at the inlet 130. The upper chamber 110 side profile forms a roughly heart-shaped lobe that is larger in relation to the similarly-shaped lower chamber 120 heart-shaped lobe (as illustrated by the dashed lines in FIG. 6). FIGS. 7-12 show an embodiment of the present invention where multiple flat fabric panels have been sewn together to create the airbag structure as described herein. The panels may be cut and sewn in multiple configurations as may be known to the ordinarily skilled artisan so long as the upper airbag section is larger than the lower airbag section. In other words, the upper chamber has a larger surface area to cover the span of the chest/torso, and also is configured to contain a larger volume of air once inflated. The lower chamber is to be configured to have a slightly smaller surface area to cover the occupant's lap area and is configured to contain a lower volume of air than the upper chamber.

Another embodiment of the present invention is shown in FIGS. 1-2 and 13-14. In these figures, we disclose a restraint system 200 where the system comprises a lap expanding reactionary airbag 100, as disclosed above. Additionally, the system includes other restraint components such as, but not limited to, a seat belt 140, an inflator 150, a fill tube 160, a coupler 170 to attach the airbag and fill tube to the inflator, and a cover 180 (not shown in an expanded airbag state, but known in the art to cover an uninflated and folded airbag).

Figure 15:
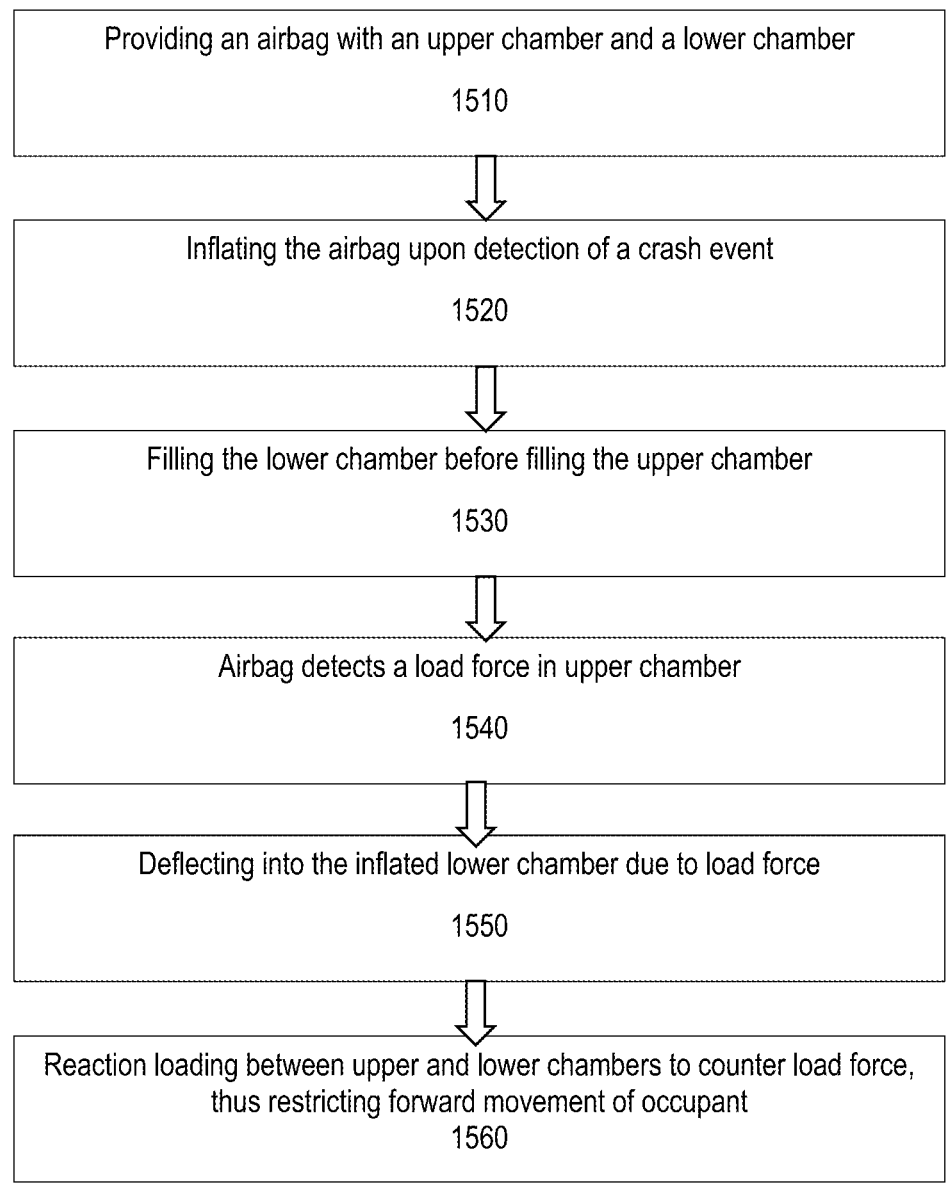
FIG. 15 is a high-level operational flow diagram of a method implementing a lap expanding reactionary airbag to reduce lumbar injuries in frontal and oblique crash events.

Yet another embodiment of the present invention is a method of utilizing the above-disclosed lap expanding reactionary airbag for the reduction of lumbar injuries in frontal and oblique crash events. Referring now to FIG. 15, the method 1500 includes the steps of: 1510 providing an airbag having an upper chamber, a lower chamber, and an inlet, where the upper chamber and lower chamber are configured to be wedge- or heart-shaped (wedge-shaped for one lobe, heart-shaped for two lobes), the upper chamber configured to contain a volume of air larger than the lower chamber, the narrow ends of each wedge-shaped chamber disposed proximate to each other and to a common inlet, and the wide ends of each wedge-shaped chamber disposed distal to each other; 1520 inflating of the airbag upon the detection of a crash event; 1530 filling of the lower chamber before the filling of the upper chamber due to the lower volume capacity of the lower chamber relative to the upper chamber; 1540 receiving of a load force by the upper chamber; 1550 deflecting of the upper chamber into the inflated lower chamber due to the received load force; and 1560 reaction loading between the upper chamber and lower chamber thereby countering the load force received by the upper chamber, whereby the upper chamber and lower chamber react off of each other and restrict the forward movement of an occupant, thereby providing a reduction of lumbar injuries in frontal and oblique crash events.

For embodiments of the present invention adapted for use in vehicles regulated by the Federal Aviation Administration (FAA), the materials, structures, and manufacturing methods used are contemplated to comply with applicable Federal Aviation Requirements (FARs).

It will be appreciated that the devices, apparatus, and systems described above are set forth by way of example and not by limitation. Numerous variations, additions, omissions, and other modifications will be apparent to one of ordinary skill in the art.

While particular embodiments of the present invention have been shown and described, it will be apparent to those skilled in the art that various changes and modifications in form and details may be made therein without departing from the spirit and scope of the invention.

In light of the foregoing description, it should be recognized that embodiments in accordance with the present invention can be realized in numerous configurations contemplated to be within the scope and spirit of the claims. Components from one embodiment can be combined with components from another embodiment. Additionally, the description above is intended by way of example only and is not intended to limit the present invention in any way.

The invention claimed is:

1. An airbag apparatus configured relative to an occupant, the apparatus comprising:
   a lower chamber disposed proximal to a lap of the occupant, said lower chamber having a substantially wedge-shaped side profile and configured to contain a first volume of air;
   an upper chamber disposed proximal to a chest of the occupant, said upper chamber having a substantially heart-shaped profile having a larger size than the lower chamber and configured to contain a second volume of air larger than the first volume of air; and
   an inlet in operable communication with both the lower chamber and the upper chamber.

2. A restraint system configured relative to an occupant and a seat, the system comprising:
   a seat belt attachable to the seat;
   an airbag apparatus disposed on the seat belt, the airbag apparatus having:
      a lower chamber disposed proximal to a lap of the occupant, said lower chamber having a substantially wedge-shaped side profile and configured to contain a first volume of air;
      an upper chamber disposed proximal to a chest of the occupant, said upper chamber having a substantially heart-shaped profile having a larger size than the lower chamber and configured to contain a second volume of air larger than the first volume of air; and
      an inlet in operable communication with both the lower chamber and the upper chamber;
   a coupler attached to the airbag apparatus;
   a fill tube attached to the coupler;
   an inflator attached to the fill tube; and
   a cover configured to cover the airbag apparatus, the cover attached to the seat belt.

3. A method of utilizing an airbag apparatus for the reduction of lumbar injuries in frontal and oblique crash events, the method comprising:
   providing an airbag apparatus configured relative to an occupant, the airbag apparatus having:

a lower chamber disposed proximal to a lap of the occupant, said lower chamber having a substantially wedge-shaped side profile and configured to contain a first volume of air;

an upper chamber disposed proximal to a chest of the occupant, said upper chamber having a substantially heart-shaped profile having a larger size than the lower chamber and configured to contain a second volume of air larger than the first volume of air; and an inlet in operable communication with both the lower chamber and the upper chamber;

a coupler attached to the airbag apparatus;

a fill tube attached to the coupler;

an inflator attached to the fill tube; and a cover configured to cover the airbag apparatus, the cover attached to a seat belt.

* * * * *